US006452368B1

(12) United States Patent
Basso et al.

(10) Patent No.: US 6,452,368 B1
(45) Date of Patent: Sep. 17, 2002

(54) CIRCUIT AND METHOD OF OPERATING A LOW-NOISE, ON-DEMAND REGULATOR IN SWITCHED OR LINEAR MODE

(75) Inventors: Christophe Basso, Pibrac (FR); Toby Kan, Shatin (HK)

(73) Assignee: Semiconductor Components Industries LLC, Phoenix, AZ (US)

( * ) Notice: Subject to any disclaimer, the term of this patent is extended or adjusted under 35 U.S.C. 154(b) by 0 days.

(21) Appl. No.: 09/733,723

(22) Filed: Dec. 11, 2000

(30) Foreign Application Priority Data

Oct. 19, 2000 (EP) .............................. 00402904

(51) Int. Cl.[7] .......................... G05F 1/565; G05F 1/40; G05F 1/44
(52) U.S. Cl. ...................... 323/282; 323/275; 323/284
(58) Field of Search ............................... 323/273, 274, 323/275, 282, 284

(56) References Cited

U.S. PATENT DOCUMENTS

| 3,665,500 | A | * | 5/1972 | Lewis et al. ................ 318/596 |
| 4,446,440 | A | * | 5/1984 | Bell ............................ 330/10 |
| 5,502,369 | A | | 3/1996 | Niwayama ................... 323/273 |
| 5,773,966 | A | | 6/1998 | Steigerwald ................. 323/284 |
| 6,057,607 | A | * | 5/2000 | Radar, III et al. .......... 323/274 |
| 6,184,663 | B1 | * | 2/2001 | Imai et al. ................... 323/274 |
| 6,188,212 | B1 | * | 2/2001 | Larson et al. ............... 323/281 |
| 6,239,509 | B1 | * | 5/2001 | Radar, III et al. .......... 323/274 |

FOREIGN PATENT DOCUMENTS

| FR | 0903839 | 3/1999 | ..................... 3/158 |
| GB | 2243961 | 11/1991 | ......................... 3/4 |
| GB | 2310570 | 8/1997 | ........................ 1/16 |

* cited by examiner

Primary Examiner—Bao Q. Vu (57) ABSTRACT

A dual mode voltage converter (18) is provided which is capable of performing linear or switched modes of operation based on an external mode select signal presented to terminal (MODE). Pulse width modulation techniques are used to regulate voltage delivered to output terminal ($V_{out}$) when a mode control signal is present at terminal (MODE) and linear conversion techniques are used in the absence of the mode control signal. Stability of voltage converter (18) is enhanced during linear conversion mode by shorting switch (60) and BW rolloff circuit (44). An alternate embodiment of dual mode voltage converter (18) provides operation based on an internal mode select signal.

8 Claims, 5 Drawing Sheets

CIRCUIT AND METHOD OF OPERATING A LOW-NOISE, ON-DEMAND REGULATOR IN SWITCHED OR LINEAR MODE

FIELD OF THE INVENTION

The present invention relates, in general, to voltage converters and, more particularly, to buck voltage converters, which can be externally programmed for switched or linear modes of operation.

BACKGROUND OF THE INVENTION

Direct Current (DC) power converters typically employ either linear conversion or switched conversion techniques to convert one DC voltage to a second DC voltage. DC power converters are necessary in most mobile electronic devices from mobile cellular telephone handsets to portable compact disc players.

Both switched mode and linear mode voltage converters employ a power Metal Oxide Semiconductor Field Effect Transistor (MOSFET) to conduct a current in response to a drive signal delivered by the voltage converter. The current conducted by the MOSFET is used to charge a storage device, such as a capacitor, which provides a source of operating potential to the voltage converter load. In a switched mode of operation, an internal clock signal sets the drive signal to the MOSFET. Once the voltage across the capacitor has been set to a predetermined voltage level, a feedback signal triggers a logic circuit to cancel the drive signal to the MOSFET and thereby prevent further charging of the capacitor. The drive signal developed by the switched mode converter typically operates between a minimum and a maximum duty cycle directly proportional to loading conditions. In other words, under high loading conditions, the duty cycle is at a maximum and under low loading conditions, the duty cycle is at a minimum.

Linear mode voltage conversion devices do not employ a switching drive signal, instead the drive signal is constantly applied to the gate of the power MOSFET. The drive signal is used to set the on resistance of the p-channel MOSFET when the device is within the low-dropout region. When the voltage across the gate terminal and the source terminal of the MOSFET is lower than the threshold voltage of the MOSFET, the on resistance of the MOSFET is set low. Conversely, when the voltage across the gate terminal and the source terminal of the MOSFET is higher than the threshold voltage, the on resistance of the MOSFET is set high. A low on resistance produces an increased voltage level at the output terminal of the linear mode voltage converter. A high on resistance produces a decreased voltage level at the output terminal of the linear mode voltage converter. In a linear mode of operation, a feedback signal is used to set the magnitude of the gate drive voltage and thus provide the required regulation.

Switched mode converters can provide high efficiency with noisy output at normal to high loading conditions. Linear mode converters can provide a low-noise, fast response output with poor efficiency. Prior art applications of buck voltage converters exist as either switched mode or linear mode conversion devices. Prior art switched converter applications, therefore, exhibit good voltage conversion efficiency under normal to high loads, but suffer at low load when the switched converter has transitioned to its minimum duty cycle. Prior art linear mode converter applications provide low noise voltage conversion, but the efficiency suffers.

Accordingly, it would be advantageous for a buck voltage converter to provide both switched mode and linear mode conversion operation to obtain optimal selectivity among noise, efficiency and response time under varying loading conditions. Additionally, it would be advantageous to allow for external control of the conversion mode by, for example, a micro-controller, so that the power conversion mode can be selected over a multitude of loading scenarios.

DETAILED DESCRIPTION OF THE DRAWINGS

Generally, the present invention provides a circuit and method for providing a low noise, on-demand, dual mode, buck voltage converter. In particular, the present invention provides a method to externally select a mode of operation for the buck voltage converter. Under maximum load conditions, the voltage converter is operating the gate drive signal of a power MOSFET transistor with maximum duty cycle for maximum power transfer in a switched mode of operation. As the load begins to require less power, the voltage converter reduces the duty cycle of the gate drive signal to some minimum value. As the load further diminishes below some minimum required duty cycle, an external detection circuit signals for the voltage converter to change from a switched mode of operation to a linear mode of operation.

Figure 1:
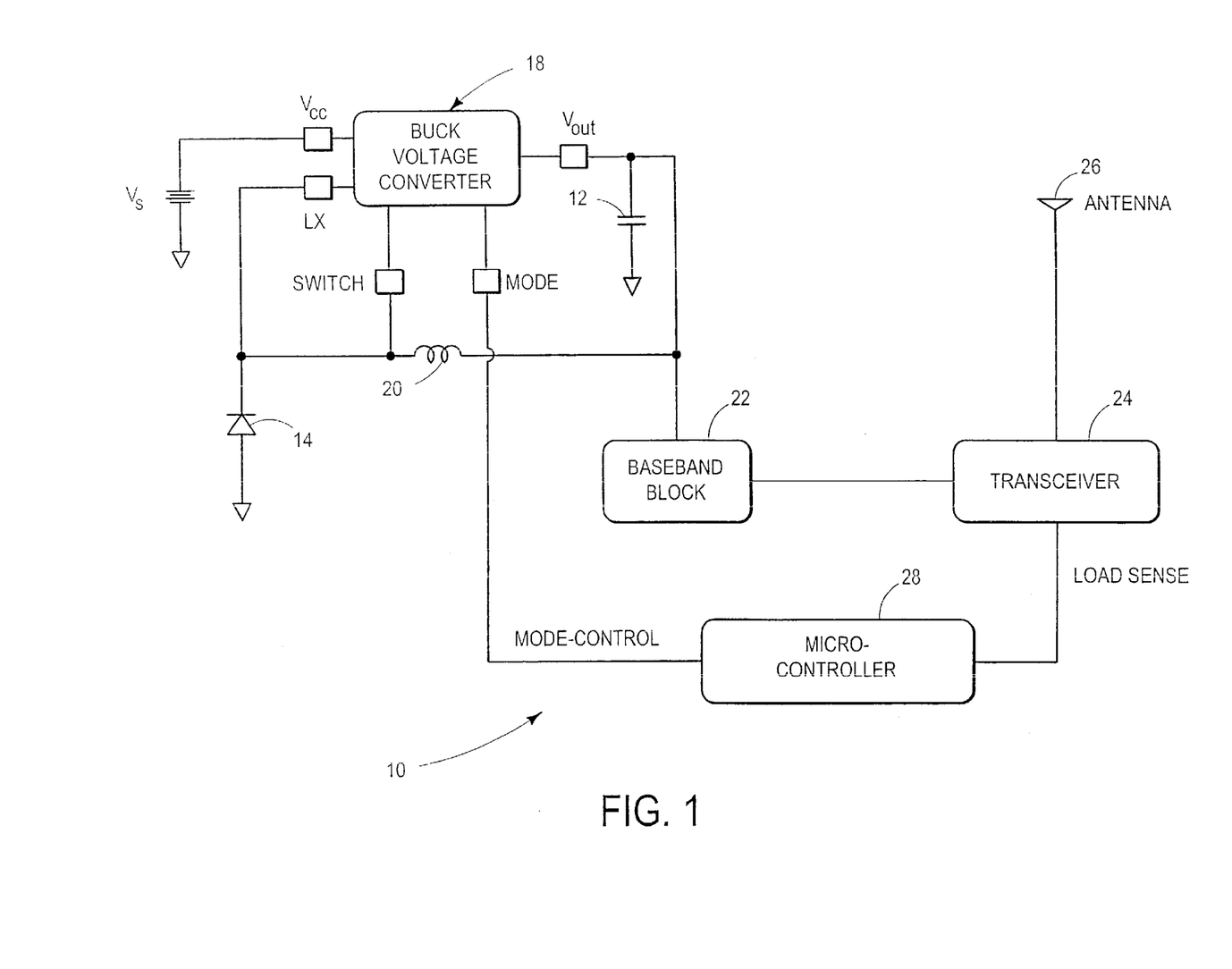
FIG. 1 is a block diagram of a dual mode, buck voltage converter as utilized in a mobile telephone handset application.

FIG. 1 is a block diagram of a dual mode voltage converter as may be utilized in a mobile telephone handset application 10, which utilizes a voltage output from buck voltage converter 18. Buck voltage converter 18 receives an operating voltage from voltage source $V_s$ at node $V_{cc}$. The cathode of diode 14 is connected to the LX terminal of buck voltage converter 18. The anode terminal of diode 14 is coupled to a second voltage source, for example, ground potential. A first terminal of inductor 20 is coupled to the cathode terminal of diode 14 and also to the SWITCH terminal of buck voltage converter 18. The second terminal of inductor 20 is coupled to the $V_{out}$ terminal of buck voltage converter 18. The $V_{out}$ terminal of buck voltage converter 18 is additionally coupled to baseband block 22 and capacitor 12 to provide a source of operating potential to baseband block 22. Micro-controller 28 is coupled to the MODE terminal of voltage converter 18 and is additionally coupled to transceiver 24. Transceiver 24 is finally coupled to antenna 26, for example, to receive and transmit communications.

Micro-controller 28 is coupled to transceiver 24 via the LOAD SENSE data connection. Micro-controller 28 monitors transceiver activity and the corresponding load requirements of the baseband block 22. Transceiver 24, for example, utilizes maximum power when transmitting voice data to a corresponding mobile base station when the mobile telephone is engaged in communication with another mobile telephone or terrestrial connection. Accordingly, buck voltage converter 18 supplies maximum power and maximum efficiency, since buck voltage converter 18 is commanded to a switched mode of operation by micro-controller 28. Micro-controller 28 programs buck voltage converter into a switched mode operation by applying a mode signal to terminal MODE. During switched mode operation, buck voltage converter 18 adjusts the duty cycle of a gate drive signal of an internal transistor according to the power requirements of the load. As the load at terminal $V_{out}$ requires less power, the voltage at terminal $V_{out}$ increases above some predetermined threshold and the duty cycle of the gate drive signal is decreased. Decreasing the duty cycle of the gate drive signal also decreases the amount of time that capacitor 12 is being charged during a charging cycle of buck voltage converter 18. Increasing the duty cycle of the gate drive signal also increases the amount of time that capacitor 12 is being charged during a charging cycle of buck voltage converter 18. A duty cycle, therefore, is associated with the gate drive signal as being the ratio of time when the capacitor 12 is being charged to the time that the capacitor 12 is discharging during one charging cycle in a switched mode of operation. Buck voltage converter 18 adjusts the duty cycle of the gate drive signal between a minimum and a maximum value while buck voltage converter 18 is programmed for switched mode operation based on an internal feedback signal developed within buck voltage controller 18.

Conversely, micro-controller 28 senses inactivity within transceiver 24 during a stand-by mode of operation where no communications are taking place. Under low load, the power required by baseband block 22 reduces below the minimum power that can be produced by buck voltage converter 18 during the switched mode of operation. Micro-controller 28 senses the stand-by mode through signal LOAD SENSE and signals buck voltage converter 18 to a linear mode of operation via the MODE terminal. Micro-controller 28 programs buck voltage regulator 18 to a linear mode of operation by removing the mode signal at terminal MODE. During linear conversion operation, an internal p-channel MOSFET is constantly supplying current to capacitor 12. The amount of current delivered to capacitor 12 is determined by an internally generated feedback signal. The application block diagram 10 of FIG. 1 merely displays a single application of buck voltage converter 18 and is not intended to limit the scope of applications for buck voltage converter 18.

Figure 2:
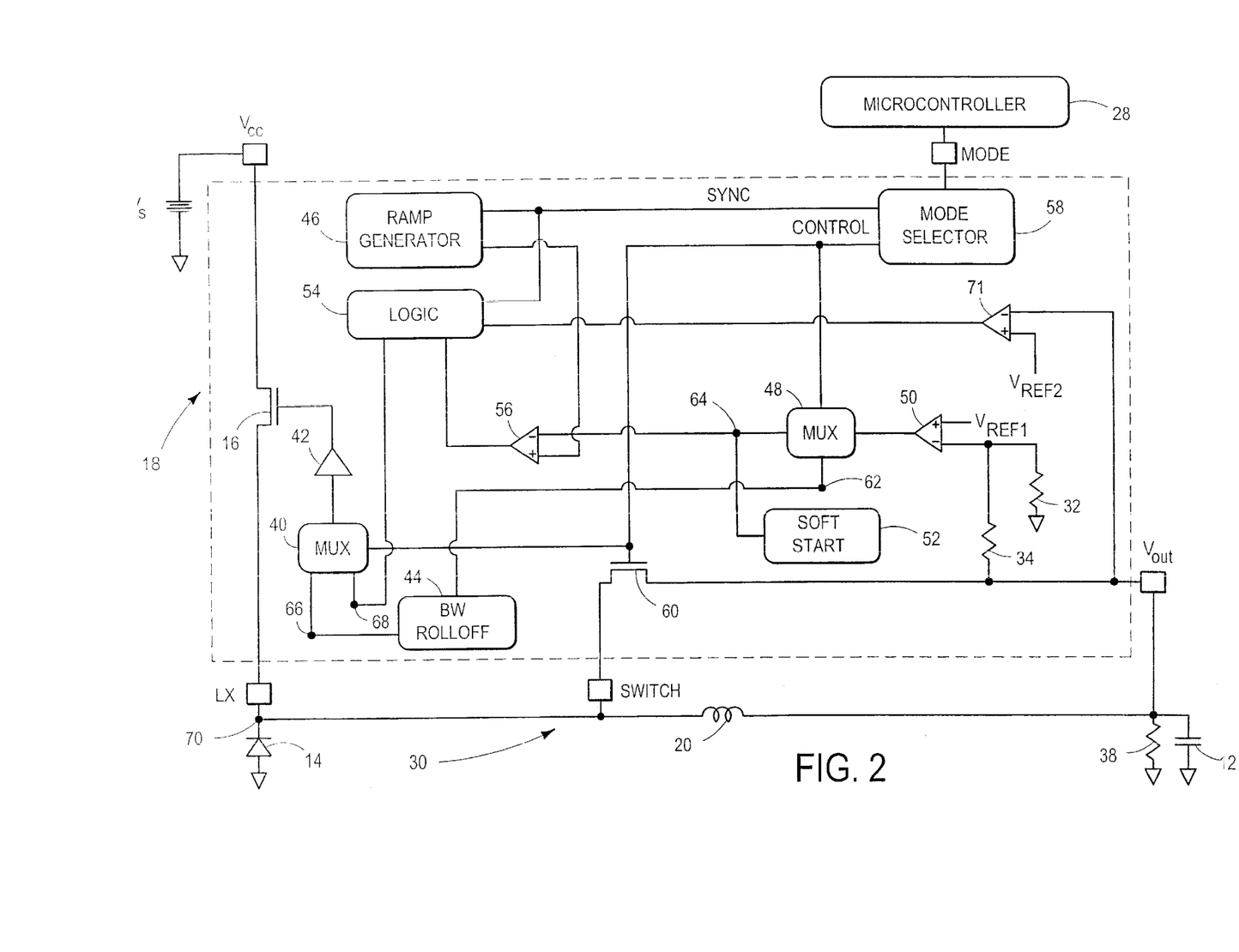
FIG. 2 is a detailed block diagram of the dual mode, buck voltage converter of FIG. 1.

FIG. 2 displays a detailed block diagram of buck voltage converter 18. Buck voltage converter 18 can be implemented on an Integrated Circuit (IC) containing only 5 pins. The pin count of IC 18 can be reduced by internally connecting the LX pin to the SWITCH pin, such that the LX pin can be removed, rendering a 4 pin package. As discussed hereinafter, a further reduction in pin count can be implemented by utilizing internal mode control, thereby allowing removal of the MODE pin, to render a 3 pin IC package. An input voltage supply $V_s$ is supplied to buck converter 18 via terminal $V_{cc}$. A resistive ladder 32 and 34 is connected serially between terminal $V_{out}$ and a second supply voltage, for example, ground potential. The divided voltage between resistors 32 and 34 is coupled to the inverting input of error amplifier 50. The non-inverting input to error amplifier 50 is coupled to a predetermined voltage reference $V_{ref}$. The output of error amplifier 50 is coupled to the input of multiplexer 48. Soft start block 52 is coupled between the output of multiplexer 48 and the input to comparator 56. One output of MUX 48 is coupled to the input of bandwidth (BW) rolloff block 44 at node 62. The output of BW rolloff block 44 is coupled to the first input of MUX 40 at node 66. The output of MUX 40 is coupled to driver 42. The output of driver 42 is coupled to the gate terminal of transistor 16. The source terminal of transistor 16 is coupled to the $V_{cc}$ terminal of buck voltage converter 18 and the drain terminal of transistor 16 is coupled to the LX terminal of buck voltage converter 18. A second output of MUX 48 is coupled to the inverting input of amplifier 56 at node 64. The output of ramp generator 46 is coupled to the non-inverting input of amplifier 56. The output of comparator 56 is coupled to logic block 54. The output of logic block 54 is coupled to the second input of MUX 40 at node 68. The MODE terminal is coupled to the input of mode selector 58. The CONTROL output of mode selector 58 is coupled to the control input of MUX 48, the control input of MUX 40, and the gate terminal of transistor 60. The SYNC output of mode selector 58 is coupled to ramp generator 46 and to logic block 54. An error detection block 71 is coupled to the output voltage terminal $V_{out}$ and the output of error detection block 71 is coupled to logic block 54.

At startup, output capacitor 12 is fully discharged. A MODE signal is present at terminal MODE, which programs the operation of buck voltage converter 18 to a switched mode of operation. The output of error amplifier 50, under normal operating conditions, would be substantially set to the positive operating voltage $V_{cc}$, since the inverting input voltage is below the voltage at its non-inverting input, $V_{ref}$. The output of error amplifier 50 is, however, limited by the operation of soft start block 52. Soft start block 52 reacts to the error signal produced by error amplifier 50, since multiplexer 48 has been programmed to switched mode of operation by the CONTROL signal. Soft start block 52, therefore, only senses the output of error amplifier 50, during switched mode of operation and further, is only active during start up of the switched mode of operation.

Figure 3:
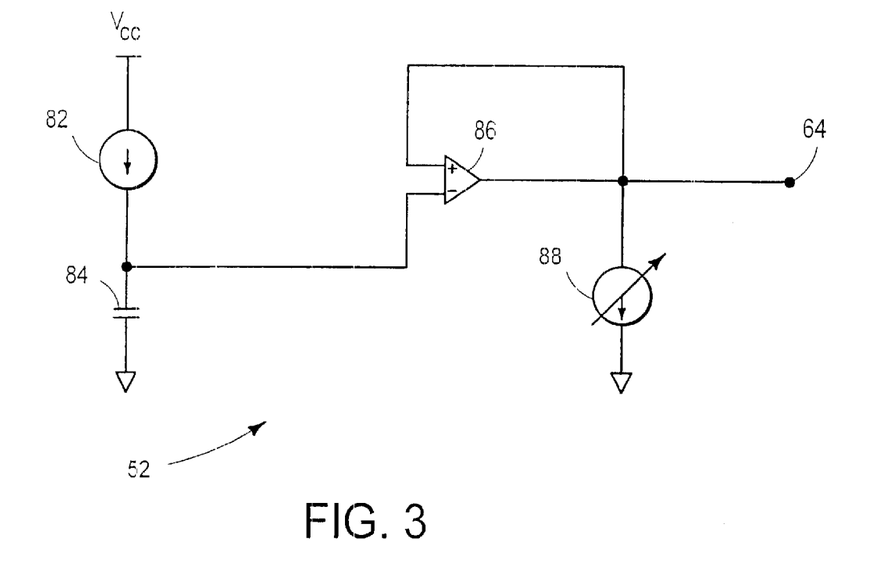
FIG. 3 is a detailed schematic of the soft start circuit illustrated in FIG. 2.

FIG. 3 illustrates a detailed schematic of soft start block 52. Node 64 is the sense terminal used by soft start block 52 to limit the output voltage of error amplifier 50. The common node between current source 82 and capacitor 84 is coupled to the inverting input to comparator 86. The input to current source 82 is coupled to the first supply voltage $V_{cc}$. The output of comparator 86 is coupled to the input of current source 88 at node 64. As discussed earlier, error amplifier 50, at start up, attempts to drive the output of error amplifier 50 to a maximum output voltage, since the non-inverting input is at a higher voltage than the inverting input. At startup, the inverting input to comparator 86 is driven by a current source 82 coupled in series with capacitor 84. As $V_{cc}$ is applied to the current source 82, current is conducted by capacitor 84, which develops a positively sloping voltage across capacitor 84. Soft start circuit 52, receives the output voltage of error amplifier 50 at node 64 and compares the error voltage from error amplifier 50 to the voltage developed across capacitor 84. As the non-inverting input to comparator 86 attempts to rise to a voltage higher than the voltage at the inverting input to comparator 86, the output of comparator 86 increases in voltage, which in turn controls current source 88 such that the current conducted by current source 88 increases in amplitude. The additional current required by current source 88 is delivered by error amplifier 50, such that the amount of current required by current source 88 prevents the voltage at the output of error amplifier 50 from reaching full scale value. As the voltage at the inverting input to comparator 86 rises with accumulating charge across capacitor 84, the output of comparator 86 lowers in amplitude, diminishing the current demanded by current source 88. Less current demanded by current source 88 allows the output voltage of error amplifier 50 to increase. Once capacitor 84 has fully charged, current source 88 is completely turned off, thereby allowing full scale deflection of the output of error amplifier 50. The time required to fully charge capacitor 84, for example, is on the order of several milli-seconds (ms). Start up block 52, therefore, limits full scale output deflection of error amplifier 50 for several milli-seconds. Limiting full scale output deflection of error amplifier 50 results in start up operation of buck voltage converter 18 at minimum duty cycle. The duty cycle is allowed to increase at the rate that capacitor 84 is allowed to charge, thereby, substantially eliminating current spikes delivered to load 38. Once an amount of time equal to approximately several milli-seconds transpires, buck voltage converter begins operating nominally in switched mode operation according to the load requirements of load 38.

Buck voltage converter 18, comprises a dual mode, buck voltage converter which provides either switched mode or linear mode voltage conversion operation. MUX 48 and MUX 40 represent a mirrored switch configuration where the switch positions of MUX 48 and MUX 40 mirror each other, depending upon the mode selected by the external signal present at terminal MODE. During switched mode operation, MUX 48 is providing the output of error amplifier 50 to node 64 and MUX 40 is receiving pulse width modulation (PWM) information at node 68. During linear mode operation, MUX 48 is providing the output of error amplifier 50 to bandwidth (BW) rolloff block 44 at node 62 and MUX 40 is receiving a low-pass filtered feedback signal from BW rolloff block 44 at node 66. Mode selector 58, upon receiving a mode signal at node MODE, asserts signal CONTROL and provides a synchronization signal SYNC which commands switching mode operation of buck voltage converter 18.

Figure 4:
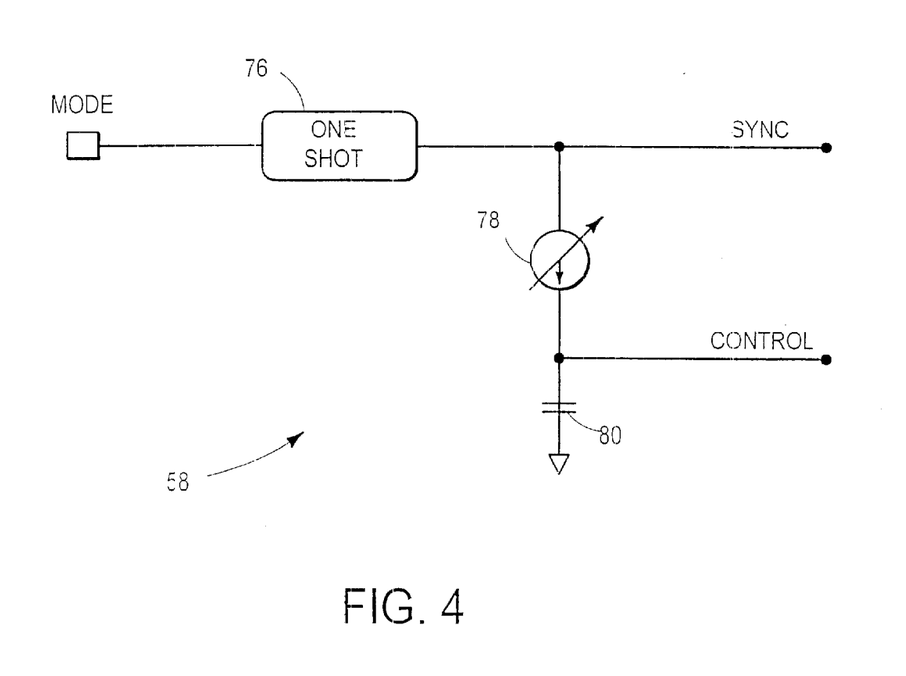
FIG. 4 is a detailed schematic of the mode selector circuit illustrated in FIG. 2.

FIG. 4 illustrates a detailed schematic of mode selector 58. Terminal MODE receives a square wave signal from, for example, microcontroller 28. Each rising edge of the square wave triggers one shot circuit 76, such that the output of one shot 76 provides a rising edge, substantially in phase with the rising edge of the input square wave, disregarding the propagation delay of one shot 76. One shot 76 performs a pulse shaping function on the input square wave at node MODE, since the duty cycle of the square wave can vary over a wide range. One shot 76, therefore, provides a fixed duty cycle output, SYNC, in response to the input square wave at node MODE. Signal SYNC drives current source 78, such that the current source provides current, which charges capacitor 80, during a logic high duration of one shot 76. While a square wave is present at node MODE, the output of one shot 76 is providing control pulses to current source 78, which in turn, charges capacitor 80. Capacitor 80 charges to a logic high state, which asserts logic signal CONTROL. The absence of signal MODE cancels output pulses from one shot 76, which in turn, cancels the current charge into capacitor 80. Canceling the charge current into capacitor 80 renders signal CONTROL to a logic low state, once the capacitor has discharged.

Figure 6:
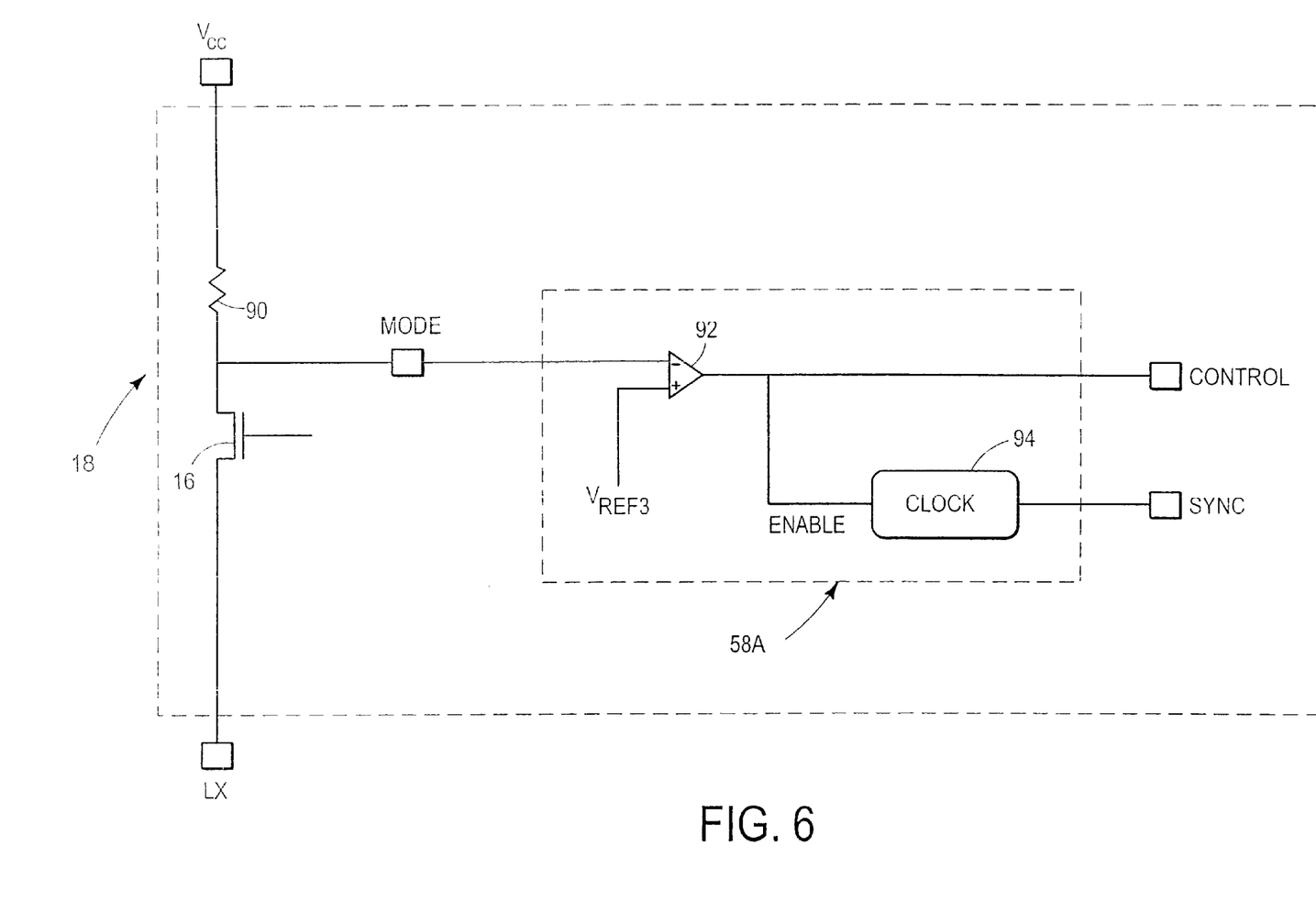
FIG. 6 is an alternate schematic of the mode selector circuit.

FIG. 6 illustrates an alternate embodiment 58A of mode selector 58. Mode selector 58A illustrated in FIG. 6 decreases the number of pins required for the IC implementation of buck voltage converter 18, since mode selector 58A does not require an external mode control. Using the mode control circuit of FIG. 6, therefore, decreases the pin count of buck voltage converter 18 from 5 pins to 4 pins. Internal mode control is provided by comparator 92, which has an inverting input coupled to a first conduction terminal of transistor 16 and a first terminal of resistor 90. It should be noted that transistor 16 is the same transistor depicted in FIG. 2. The second terminal of resistor 90 is coupled to supply voltage $V_{cc}$. The non-inverting input to comparator 92 is coupled to reference voltage $V_{ref3}$. The output of comparator 92 provides the control signal used to determine a switched mode or linear mode of operation. Reference voltage $V_{ref3}$ is a predetermined reference voltage indicative of the output current supplied by buck voltage converter 18. When the output current of buck voltage converter 18 is below a predetermined value, the voltage drop across resistor 90 will be such that the voltage at the inverting input to comparator 92 will exceed $V_{ref3}$. When the voltage at the inverting input of comparator 92 exceeds $V_{ref3}$, the output of comparator 92 is at a logic low, indicating a low load condition. A low load condition will trigger linear mode of operation by un-asserting the CONTROL signal and disabling clock 94. When the output current of buck voltage converter 18 is above a predetermined value, the voltage drop across resistor 90 will be such that the voltage at the inverting input to comparator 92 will not exceed $V_{ref3}$. When the voltage at the inverting input of comparator 92 does not exceed $V_{ref3}$, the output of comparator 92 is at a logic high, indicating a high loading condition by asserting the CONTROL signal. A high loading condition will trigger switched mode operation and will assert the CLOCK signal by enabling clock 94 to provide the SYNC signal. Thus, use of mode selector 58A allows internal control of terminal MODE through the addition of resistor 90 in series with the conductive path of transistor 16, comparator 92 and clock 94 as shown in FIG. 6. All other connections are equivalent to the connections illustrated in FIG. 2. Equivalent CONTROL and SYNC signals are provided by mode selector 58A by comparator 92 and clock 94, respectively.

Ramp generator 46 and amplifier 56 combine to form a reset function which cancels the gate drive signal to transistor 16 when in switched mode operation. In switched converter mode, MUX 48 applies the error voltage from error amplifier 50 to the inverting input of amplifier 56. The non-inverting input of amplifier 56 receives the output of ramp generator 46. Ramp generator 46 delivers a fixed, sawtooth waveform preferably operating between the minimum and maximum output voltage levels of error amplifier 50. The sawtooth waveform is synchronized to signal SYNC, such that the voltage at the non-inverting input of comparator 56 begins to rise at the falling edge of signal SYNC. Comparator 56 compares the magnitude of the error signal from error amplifier 50 to the magnitude of the sawtooth signal at the non-inverting input of comparator 56. If the sawtooth signal is at a magnitude smaller than the magnitude of the error signal from error amplifier 50, then the output of comparator 56 is set to a logic low. Conversely, if the magnitude of the sawtooth signal is larger than the error signal from error amplifier 50, the output of comparator 56 is set to a logic high. It can be seen, therefore, that the output of comparator 56 is a square wave having a variable duty cycle which is inversely proportional to the amplitude of the output of error amplifier 50.

Error amplifier 50 is internally compensated such that the output of error amplifier 50 is indirectly proportional to the inverting input to error amplifier 50. Error amplifier 50 delivers a range of output voltage, which is indirectly proportional to the output load requirements of buck voltage converter 18. When buck voltage converter 18 is operating at maximum load, the voltage at capacitor 12 is at a minimum level and error amplifier 50 output voltage is at a maximum. When buck voltage converter 18 is operating at minimum load, the voltage at capacitor 12 is at a maximum level and error amplifier output voltage is at a minimum.

Maximum output voltage from error amplifier 50, indicates a maximum load applied to terminal $V_{out}$. Maximum output voltage from error amplifier 50 is delivered to the inverting input of comparator 56 during switched mode operation under a maximal load condition. Ramp generator 46 delivers a sawtooth waveform with a fixed peak voltage to the non-inverting input of comparator 56. Since the inverting input to comparator 56 is at a voltage higher than the voltage at the non-inverting input to comparator 56 throughout the majority of one complete cycle of the sawtooth waveform, the output of comparator 56 only transitions to a logic high output voltage when the sawtooth waveform has transitioned to near the end of a cycle. The output of comparator 56 does not transition to a logic high state until the end of a cycle of the sawtooth waveform, which minimizes the width of the pulse transmitted by comparator 56. Logic circuit 54 asserts the drive signal to the input terminal of driver 42, while the output of comparator 56 is low. Once the output of comparator 56 transitions to a logic high state, logic circuit 54 resets the drive signal to driver 42. Logic circuit 54, therefore, provides a maximum duty cycle drive signal to MOSFET 16 under maximum loading conditions. Driver 42 inverts the signal transmitted from logic circuit 54, such that the gate drive signal to p-type transistor 16 causes a voltage across the gate terminal and the source terminal of transistor 16 to be less than the threshold voltage of transistor 16, which places transistor 16 into a conductive state. During switched mode operation, the logic low voltage of the gate drive signal sets the on-time of transistor 16. During the on-time of transistor 16, in switched mode operation, the on resistance of transistor 16 is at a minimum value which maximizes the amount of current sourced to capacitor 12, producing maximum drive under heavy loading conditions for the majority of the switching cycle. In other words, under heavy loading conditions in switched conversion mode, buck voltage converter 18 delivers a maximum amount of current to capacitor 12 for a maximum amount of time during a switching cycle.

Minimum output voltage from error amplifier 50, indicates a minimum load applied to terminal $V_{out}$. Minimum output voltage from error amplifier 50 is delivered to the inverting input of comparator 56 during switched mode operation under a minimal load condition. Since the inverting input to comparator 56 is at a voltage lower than the voltage at the non-inverting input to comparator 56 throughout the majority of one complete cycle of the sawtooth waveform generated by ramp generator 46, the output of comparator 56 only transitions to a logic low output voltage at the beginning of one cycle of the sawtooth waveform and subsequently transitions to a logic high voltage once the sawtooth waveform has exceeded the voltage from error amplifier 50. Logic block 54 resets the drive signal delivered to MOSFET 16 upon receiving a logic high voltage from comparator 56. Driver 42 inverts the signal transmitted from logic circuit 54, such that the gate drive signal to p-type transistor 16 causes a voltage across the gate terminal and source terminal of transistor 16 to be greater than the threshold voltage of transistor 16, which places transistor 16 into a non-conductive state. During switched mode operation, under low loading conditions, the on-time of transistor 16 is set to a minimum during one switching cycle, by the gate drive signal. In other words, under light loading conditions in switched conversion mode, buck voltage converter 18 delivers a maximum amount of current to capacitor 12 for a minimum amount of time during a switching cycle. A method whereby switched mode voltage conversion is performed, therefore, has been described which maintains a fixed amount of drive current to capacitor 12 for a variable amount of time during a switching cycle.

Figure 5:
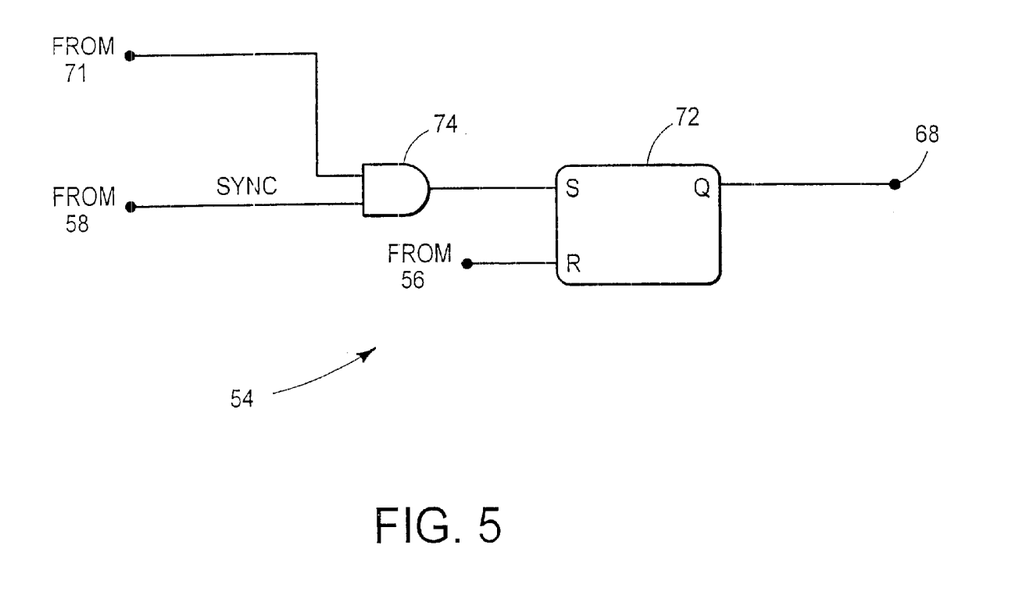
FIG. 5 is a detailed schematic of the logic circuit illustrated in FIG. 2.

FIG. 5 illustrates a detailed schematic of logic circuit 54. AND gate 74 receives signal SYNC from mode selector 58. AND gate 74 also receives a protection signal from detector circuit 71. SR flip flop 72 receives the output of AND gate 74 at the set input. The reset input to SR flip flop 72 is coupled to the output of comparator 56. Flip flop 72 is edge triggered, such that a leading edge presented to the set input causes the Q output to transition to a logic high voltage. The Q output sets to a logic high voltage until a logic low to high voltage transition is presented to the reset input to RS flip flop 72. The Q output of flip flop 72, therefore, asserts the gate drive signal to driver 42 when the set input transitions to a logic high voltage. Conversely, the gate drive signal to driver 42 is unasserted, when the reset input of flip flop 72 transitions to a logic high voltage. Logic circuit 54 masks the SYNC signal from setting flip flop 72 during an error condition of buck voltage converter 18. Detector circuit 71, for example, detects an over-voltage condition by sensing the voltage at terminal $V_{out}$ and comparing the output voltage $V_{out}$ to reference voltage $V_{ref2}$. Detector 71 provides a logic high voltage during normal operation since the output voltage is below reference voltage $V_{ref2}$. Detector 71 provides a logic low voltage, however, when the output voltage $V_{out}$ is above reference voltage $V_{ref2}$. Detector 71, therefore, effectively masks the SYNC signal during an over-voltage condition, since the output of AND gate 74 remains low during an over-voltage condition, regardless of the state of the SYNC signal. Detector 71 prohibits the start of a charging cycle, until the over-voltage condition ceases. Similarly, additional protection circuits, such as over-current protection, can be implemented and the output of the additional protection circuits can be provided to the input of AND gate 74, thereby providing masking control of the gate drive signal for numerous error conditions.

During switched mode operation of buck voltage converter 18, the conductive state of transistor 16 is controlled by a PWM control signal, delivered by dual mode driver 42. Dual mode driver 42 inverts the PWM control signal to transistor 16, delivered by logic circuit 54, to control the conduction state of transistor 16. Driver 42, in addition, inverts the error signal delivered by BW rolloff 44 during linear mode operation. During a linear mode of operation, dual mode driver 42 serves to linearly drive the gate terminal of transistor 42, to control the on resistance of transistor 16, as discussed before.

When transistor 16 is in a conductive state, during switched mode operation, a voltage equal to $V_s$ is applied to node 70. The amount of voltage developed at terminal $V_{out}$ is determined by the integration operation of inductor 20 and capacitor 12. Since inductor 20 and capacitor 12 implement an integrator, the voltage at terminal $V_{out}$ is characterized by exponential function $V_{out} = V_s(1-e^{-tL/RC})$, where t is the integration time or on time of transistor 16, L is the inductance of inductor 20 and C is the capacitance of capacitor 12. The output voltage is therefore programmable by appropriate selection of the on time of transistor 16. Additionally, $V_{out}$ may be programmed by appropriate selection of $V_{ref1}$ and voltage divider 34 and 32.

Once buck voltage converter 18 has provided adequate operating potential at terminal $V_{out}$, the drive signal is removed from the gate of transistor 16 and transistor 16 is placed into a non-conductive state. Energy stored by inductor 20 is conducted by diode 14. Removal of voltage $V_s$ from terminal 70 results in a voltage inversion across inductor 20. The voltage inversion provides enough negative potential at the cathode of diode 14 to forward bias diode 14 and present a voltage equal to its forward dropout voltage, which is typically −0.6 V, at node 70. Diode 14, therefore, provides a low impedance path, which conducts current generated by the stored magnetic energy of inductor 20 during the off time of transistor 16. During switched mode operation of buck voltage converter 18, the voltage at node 70 transitions from approximately −0.6 V to $V_s$ during one charging cycle.

The conversion mode performed by buck converter 18 is programmed externally via terminal MODE. An external signal is generated, for example, by micro-controller 28. The external signal is presented as a clock signal to the MODE terminal operating at some nominal frequency. The presence of a clock signal operating at the MODE input of buck voltage converter 18, determines the value of the CONTROL output of mode selector 58. The CONTROL output of mode selector 58 selects switched mode operation when a clock signal is present at the MODE terminal and the CONTROL output of mode selector 58 selects linear mode operation when a clock signal is not present at the MODE terminal. Mode selector 58 generates a SYNC signal, synchronized to the clock signal applied to the MODE terminal, when switched mode operation is selected. The SYNC signal is then applied to ramp generator 46 which causes the sawtooth waveform generated by ramp generator 46 to be coherent, or synchronized with, the clock signal present at terminal MODE. Buck voltage converter 18, therefore, can be characterized as a synchronous, switched mode buck voltage converter when operating in switched conversion mode.

Buck voltage converter 18 is programmed to linear conversion mode through the absence of a clocking signal at terminal MODE. Mode selector 58 provides the CONTROL signal to indicate linear mode conversion and the output of error amplifier 50 is then routed to BW rolloff block 44 by MUX 48 at node 62. MUX 40, in mirror operation to MUX 48, selects the output of BW rolloff block 44 at node 66. Inductor 20 is shorted by transistor 60 when buck voltage converter 18 is operating in linear conversion mode. The stability of buck voltage converter 18 is preserved, when operating in linear mode, by BW rolloff block 44. BW rolloff block 44 preserves the stability of the feedback loop by increasing the phase margin of the transfer function when inductor 20 has been shorted by switch 60 in linear conversion mode. Linear conversion mode of buck voltage converter 18 results in a low-noise voltage conversion operation, since transistor 16 is not switched between conductive and non-conductive states, thereby, eliminating switching noise. Buck voltage converter 18 can therefore be programmed via mode selector terminal MODE to operate in a low-noise mode of operation.

During linear operation of buck voltage converter 18, the gate drive signal to transistor 16 is generated to control the on resistance of p-channel transistor 16. A lower on resistance of transistor 16 creates a larger current drive to terminal $V_{out}$ and a higher on resistance of transistor 16 creates a smaller current drive to terminal $V_{out}$. A larger voltage at terminal $V_{out}$, indicates a low load condition which causes error amplifier 50 to generate a lower voltage. The lower voltage at the output of error amplifier 50 is low-pass filtered by BW rolloff 44 and inverted by driver 42 before being applied to the gate terminal of transistor 16. The higher gate to source voltage of transistor 16 creates a higher on resistance for transistor 16, decreasing current drive to terminal $V_{out}$ and therefore resulting in a lower output voltage at terminal $V_{out}$. A smaller voltage at terminal $V_{out}$, indicates a high load condition which causes error amplifier 50 to generate a higher voltage. The higher voltage at the output of error amplifier 50 is low-pass filtered by BW rolloff 44 and inverted by driver 42 before being delivered to the gate terminal of transistor 16. The lower gate to source voltage of transistor 16 creates a lower on resistance for transistor 16, increasing the current drive to terminal $V_{out}$ and therefore resulting in a higher output voltage at terminal $V_{out}$.

BW rolloff circuit 44 is a low pass filter implemented as an RC network which can provide enough phase shift and gain adjustment for the feedback loop in order to maintain the stability of the overall control loop. BW rolloff circuit may be implemented as a single pole, RC network having a corner frequency, for example, on the order of tens of kilohertz. BW rolloff circuit 44 is a stabilization circuit used while voltage converter 18 is in a linear mode of operation. Additionally, switch 60 implements a stability function while voltage converter 18 is operating in a linear mode, since switch 60 is conductive during linear operation, thus placing a short across inductor 20. Shorting inductor 20 during linear mode operation prevents oscillation at terminal $V_{out}$ due to inductor voltage inversion. Switching element 60 provides a resistive path to release the energy stored in the inductor when switching element 60 is rendered conductive. In linear mode operation, energy is stored in inductor 20 in the form of magnetic flux and will subsequently be delivered to load 38 and capacitor 12 when inductor 20 discharges. The charging and discharging cycle of inductor 20 repeats, causing oscillations at the output voltage terminal $V_{out}$. Shorting switch 60 is rendered conductive during linear mode, which prevents the storage of magnetic flux in inductor 60 and therefore prevents oscillations at terminal Vout The interaction between the external clocking signal present or absent from terminal MODE and the corresponding CONTROL and SYNC outputs from mode selector 56 is an important feature of buck voltage converter 18. Buck voltage converter 18 can be programmed externally to operate in a switched mode when a clock signal is present at terminal MODE and programmed to operate in a linear conversion mode when a clock signal is not present at node MODE. Mode selector 58 provides a method of synchronizing the drive signal pulses generated by buck voltage converter 18 to an external clock signal generated by, for example, micro-controller 28. Synchronizing the switching conversion operation of buck voltage converter 18 can minimize beat note frequency components produced by the difference in operating frequencies of buck voltage converter 18 and other frequency components generated by mobile telephone circuitry characterized in FIG. 1. Additionally, output stability of buck voltage converter 18 is maintained by the operation of transistor 60 operating as a shorting switch presented across both terminals of inductor 20 when buck voltage converter is operating in linear conversion mode. The absence of shorting switch 60 in the buck voltage converter block diagram of FIG. 2, would result in an output oscillation at terminal $V_{out}$, due to inductor voltage inversion when a load is applied to terminal $V_{out}$ in linear conversion mode.

By now it should be appreciated that a buck voltage converter circuit and a method for operating the buck voltage converter circuit have been provided. An advantage of buck voltage converter 18 is that it provides a method for operating the buck voltage converter circuit in both a switched mode and a linear mode of operation based on an external clock signal. Buck voltage converter 18 is operated synchronously to the external clock signal when in switched mode operation. Stabilization circuits have been provided by BW rolloff 44 and shorting switch 60 to allow controlled operation in linear conversion mode.

What is claimed is:

1. A voltage converter, comprising:

a first multiplexer having a control input for receiving a control signal and an output for selecting a switching signal when the voltage converter is operating in a switching mode or a bandwidth rolloff signal when the voltage converter is operating in a linear mode;

a first transistor having a control electrode coupled to an output of the first multiplexer for switching an inductor current at a first pin of the voltage converter to develop an output voltage at a second pin of the voltage converter when the voltage converter is operating in the switching mode; and a second transistor operating in response to the control signal for shorting the first pin to the second pin when the voltage converter is operating in the linear mode.

2. The voltage converter of claim 1, further comprising:

a second multiplexer operating in response to the control signal and having an input for receiving an error signal indicative of a level of the output voltage;

a comparator coupled to a first output of the second multiplexer for comparing the error signal with a ramp signal and producing the switching signal at an output; and a bandwidth rolloff circuit having an input coupled to a second output of the second multiplexer and an output for providing the bandwidth rolloff signal.

3. A voltage converter, comprising;

a first transistor responsive to a switching signal for switching an inductor current at a first pin to develop an output signal at a second pin when the voltage converter operates in a switching mode; and a second transistor coupled for shorting the first pin to the second pin when the voltage converter operates in a linear mode.

4. A method of providing a regulated voltage, comprising the steps of:

switching an inductor current at a first pin of an integrated circuit to develop the regulated voltage at a second pin of the integrated circuit when the integrated circuit operates in a switching mode; and shorting the first pin to the second pin when the integrated circuit operates in a linear mode.

5. The method of claim 4, further comprising the steps of:

routing the regulated voltage to a first node as a switching signal during the switching mode; and routing the regulated voltage to a second node as a bandwidth rolloff signal during the linear mode.

6. The method of claim 5, further comprising the step of multiplexing the regulated voltage with a control signal to produce the switching and bandwidth rolloff signals.

7. The method of claim 6, wherein the step of switching includes the step of applying a switching signal to a first transistor to produce the inductor current.

8. The method of claim 7, wherein the step of shorting includes the step of turning on a transistor with the control signal.

\* \* \* \* \*